United States Patent [19]

Grabovac

[11] 3,979,942
[45] Sept. 14, 1976

[54] TORQUE TOOL TESTER
[75] Inventor: Bosko Grabovac, Mission Viejo, Calif.
[73] Assignee: Consolidated Devices, Inc., City of Industry, Calif.
[22] Filed: Nov. 18, 1974
[21] Appl. No.: 524,552

[52] U.S. Cl. .................................................. 73/1 C
[51] Int. Cl.² ........................................ G01L 25/00
[58] Field of Search ................. 73/1 C, 136 C, 138, 73/139

[56] References Cited
UNITED STATES PATENTS

| | | | |
|---|---|---|---|
| 2,281,226 | 4/1942 | Boles | 73/139 X |
| 2,486,632 | 11/1949 | Burke et al. | 73/1 C |
| 2,648,219 | 8/1953 | Emery | 73/1 C |
| 3,286,504 | 11/1966 | Grabovac | 73/1 C |
| 3,364,725 | 1/1968 | Grabovac | 73/1 C |

Primary Examiner—Herbert Goldstein
Assistant Examiner—John S. Appleman
Attorney, Agent, or Firm—Georges A. Maxwell

[57] ABSTRACT

A torque wrench tester comprising a single elongate deflection beam, a plurality of torque wrench engaging input shafts drivingly connected with the beam at points spaced longitudinally thereof and each to deflect the beam in response to a predetermined range of torsional forces applied thereto and a single dial indicator related to the beam to increase deflection thereof and having calibrations for each range of forces to be measured.

7 Claims, 13 Drawing Figures

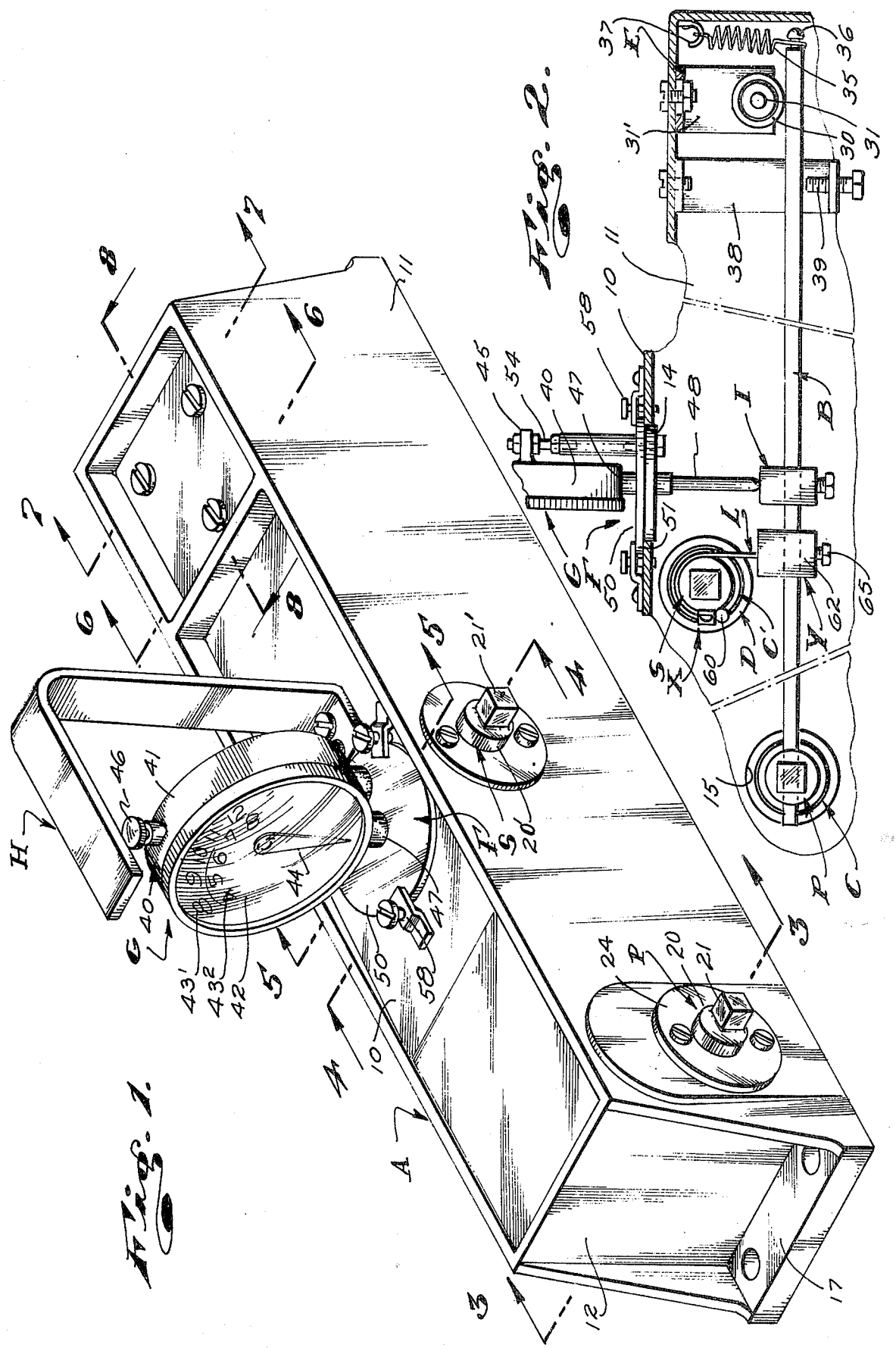

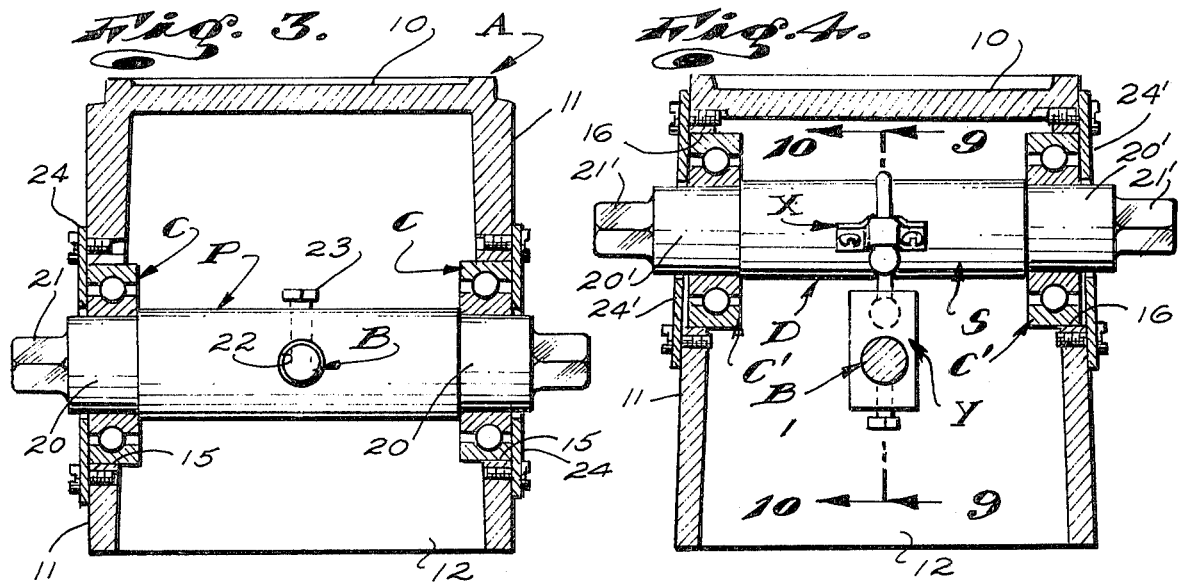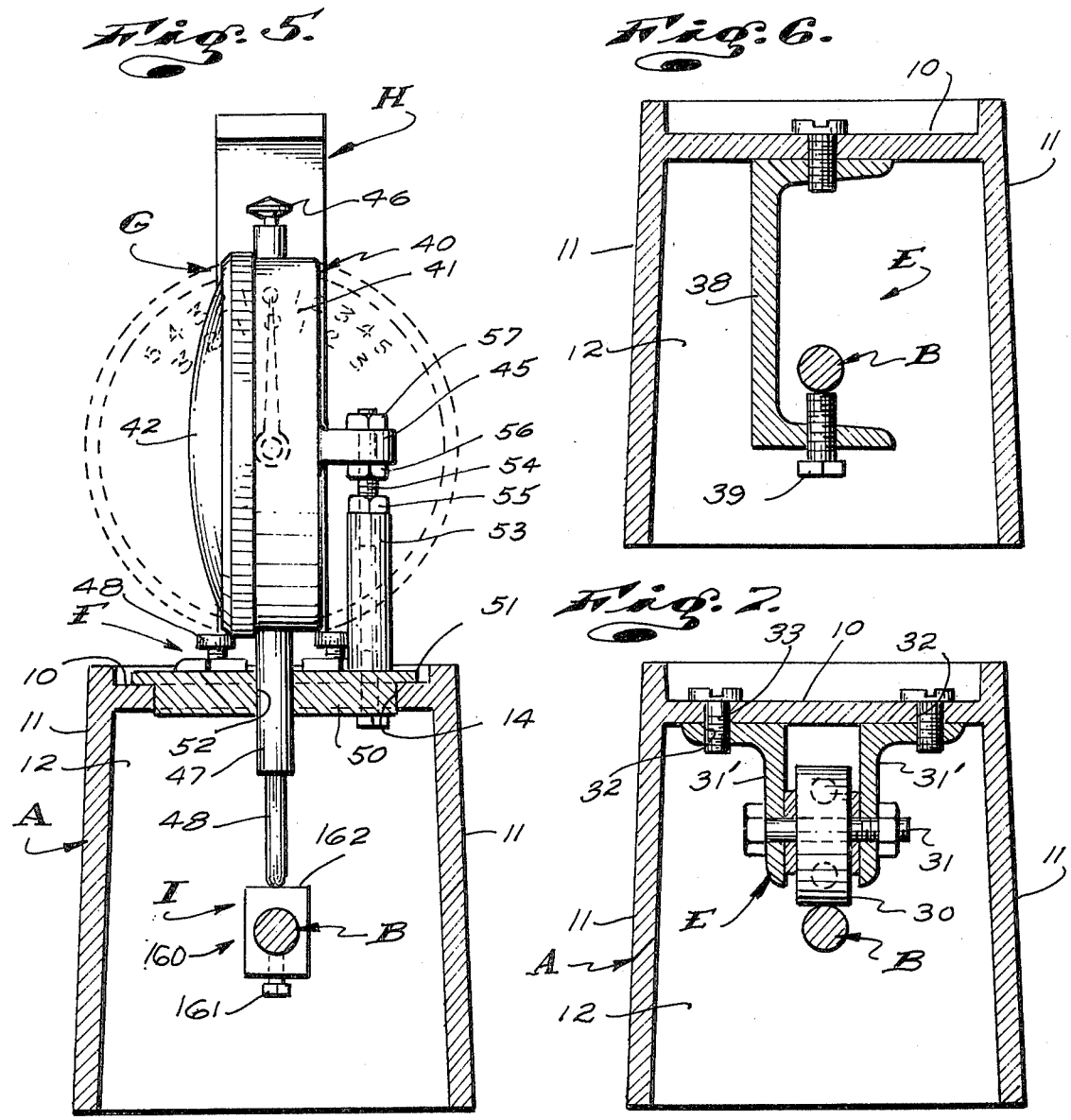

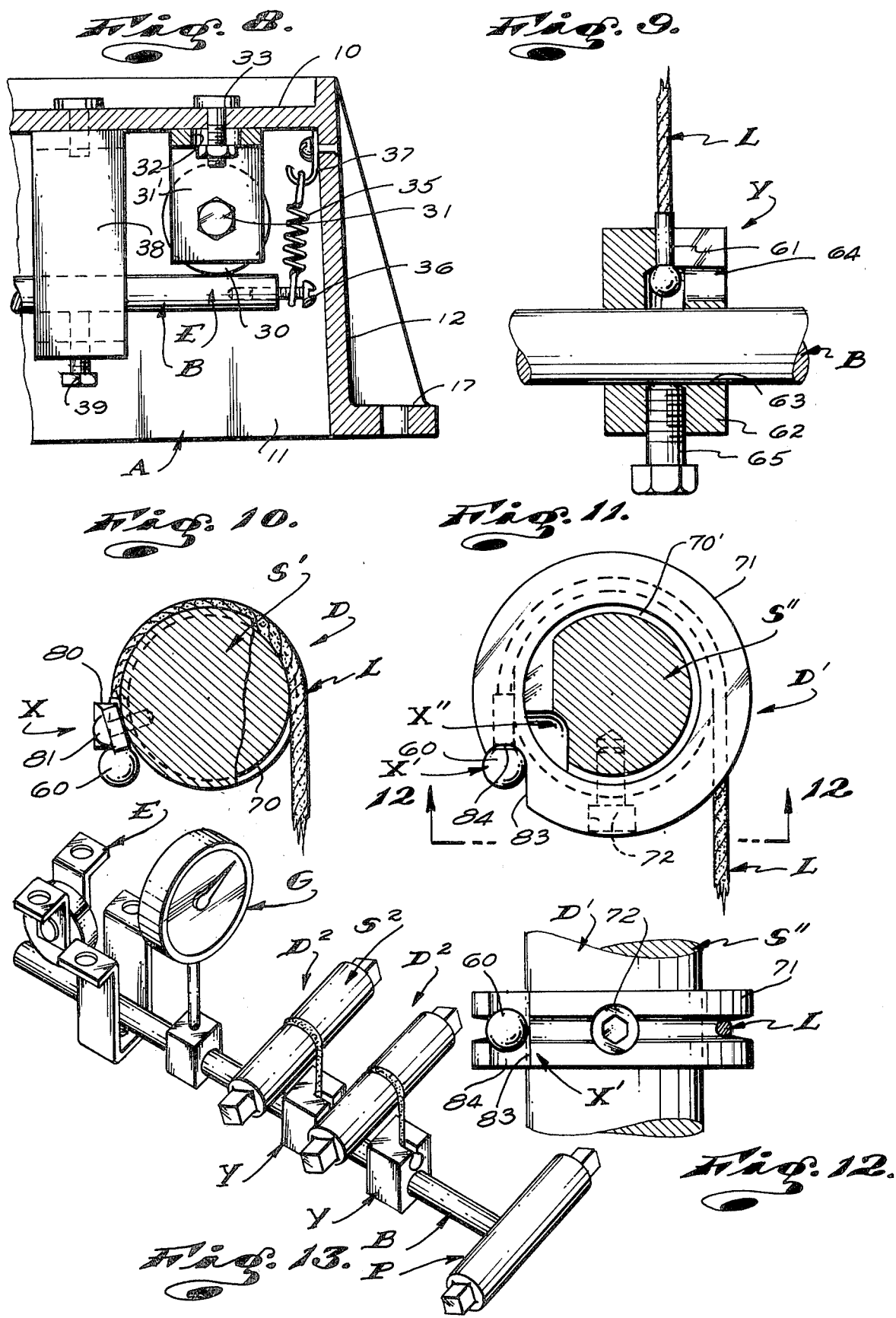

TORQUE TOOL TESTER

This invention has to do with an improved torque wrench tester. Throughout the industrial arts there are numerous instances where torsional forces must be manually applied to objects or pieces of work. The most common instances where torsional forces are manually applied are to be found in the course of advancing screw fasteners, such as screws, nuts and bolts, into or out of parts of assemblies, as they are being constructed or taken apart.

In recent years, and as the industrial arts have become more sophisticated and exacting, it has been determined that the amount of torsional forces which are applied onto and through screw fasteners is very important and oftentimes critical. As a result of the above, special wrenches or hand tools for applying limited torsional forces to fasteners and the like have become quite common and their use frequently required. Such tools are commonly called and are broadly classified as torque wrenches and are commonly characterized by elongate lever arms with work engaging heads at one of their ends and hand grips at their other ends. The work engaging heads commonly consist of short polygonal shafts at right angle to the lever arms and on or with which standard and conventional fastener engaging sockets and the like can be engaged.

Torque wrenches of the general form referred to above are provided in several different classes. The first class can be referred to as the breakaway type of torque wrench and is such that driving engagement between the lever arm and head of the tool is interrupted or broken when a predetermined, set, force is applied therebetween. The second class can be referred to as the click-type of torque wrench and is such that an audible and sensory click is transmitted by the tool when a predetermined, set, force is applied therethrough. The third class of tool can be referred to as the dial type of torque wrench and is such that the force applied through the tool is indicated on a suitable dial.

While certain of such tools called "preset tools" are set to operate at one set force and while certain of such tools are such that they will operate in but one direction, that is, in a clockwise or a counter-clockwise direction, the majority of such tools are adjustable and such that their operating forces can be varied as circumstances require and such that they will operate in both clockwise and counter-clockwise directions.

In the case of all such tools, it is necessary that they be initially adjusted so that they do in fact operate at desired, indicated force or forces and/or that the means incorporated therein to indicate the forces applied therethrough or to adjust the operating forces thereof (which means commonly includes suitable calibrated scales and related markers or indicators) correspond (within allowable tolerances) with the force or forces actually applied therethrough.

Further, in the case of all such tools, it is necessary to periodically test them to determine that they are still accurate, within allowable tolerances and/or to readjust them to compensate for wear, fatigue and other conditions and changes which take place and adversely affect their accuracy.

In accordance with the above requirements, the prior art has provided torque-wrench testers, which testers, as a general rule, can be likened to spring and/or balance scales with force input shafts with which torque wrenches can be effectively coupled or connected and which serve to indicate the magnitude of forces applied to the testers through the wrenches coupled therewith. By noting and comparing the indicated applied forces on the testers or scales with the indicated, set forces on the wrenches, it is possible to adjust the wrenches so that the two indicated forces are equal and to thereby adjust the wrenches to within desired accuracies.

While balance scale type torque wrench testers can be made quite accurate and can be made to operate over a wide range of forces, such testers are generally so large, heavy and costly that they cannot be accommodated, handled and/or afforded in the great majority of situations where a tester is desired and should be provided. As a result of the foregoing, smaller, lighter and less costly, spring scale type testers have proven to be most practical and are most commonly provided. The principal shortcoming to be found in spring-scale type testers resides in their limited range of operation. The ordinary spring scale type of tester is capable of testing wrenches designed to operate within one range of force; for example, is capable of accurate operation in a range of from 0 to 250 inch pounds or a range of from 250 to 2000 inch pounds. Accordingly, if wrenches with both these ranges are to be tested, two testers must be provided. Such duplication of equipment is costly, space-consuming and inconvenient.

In an effort to reduce the disadvantages of having to provide separate testers for each size or range of wrench to be tested, the prior art has sought to incorporate several spring scales into one tester unit and to thereby reduce the space requirement which would be demanded by separate units or testers and to reduce slightly the added weight and the cost of separate units. Such a multiple range tester is disclosed in my U.S. Pat. No. 3,364,725 issued Jan. 23, 1968, and entitled "TORQUE WRENCH TESTER". In this patent, a single unit including three separate spring scale type testing machines, in vertical and lateral spaced relationship are provided within and carried by a single housing.

While the above noted patented multiple rung tester provides a neat compact and convenient to use unit, it is apparent that while the saving of space afforded thereby is substantial, the saving of weight and cost is necessarily very limited. It is further to be specifically noted that in the noted patented tester, each separate spring scale type testing mechanism includes an independent, elongate deflection beam, an independent input shaft for the beam and an independent dial gauge or meter related to the beam.

An object and feature of the instant invention is to provide a multiple range spring scale type torque wrench tester which includes a single deflection beam, a single dial gauge related to the beam and a plurality of input shafts spaced longitudinally of the beam and operatively connected therewith to transmit forces applied to the shafts onto and through the beam.

It is an object and feature of my invention to provide a multiple range torque wrench tester of the character referred to above which requires fewer parts, is smaller, lighter and less costly than multiple range torque wrench testers provided by the prior art.

Yet another object and feature of the instant invention is to provide a torque wrench tester of the character referred to having novel dial gauge mounting means whereby the dial can be easily and effectively disposed in different directions about a vertical axis for convenient reading.

Still another object and feature of the invention is to provide a structure of the character referred to which is extremely simple and troublefree and which incorporates simple and extremely easy to operate and accurate means to effect its adjustment.

Still another object and feature of this invention is to provide a novel combination carrying handle and dial gauge guard to effect easy and convenient transporting of the tester and to protect the dial gauge from being accidentally damaged.

The foregoing and other objects and features of my invention will be apparent and fully understood from the following detailed description of a typical preferred form and embodiment of the invention throughout which reference is made to the accompanying drawing, in which:

FIG. 1 is an isometric view of my new torque wrench tester;

FIG. 2 is a longitudinal view of a portion of the tester with portions broken away and with portions shown in sections to best illustrate the invention;

FIG. 3 is a sectional view taken as indicated by line 3—3 on FIG. 1;

FIG. 4 is a sectional view taken as indicated by line 4—4 on FIG. 1;

FIG. 5 is a sectional view taken substantially as indicated by line 5—5 on FIG. 1;

FIG. 6 is a sectional view taken as indicated by line 6—6 on FIG. 1;

FIG. 7 is a sectional view taken as indicated by line 7—7 on FIG. 1;

FIG. 8 is a sectional view taken as indicated by line 8—8 on FIG. 1;

FIG. 9 is an enlarged sectional view taken substantially as indicated by line 9—9 on FIG. 4;

FIG. 10 is an enlarged sectional view taken substantially as indicated by line 10—10 on FIG. 4;

FIG. 11 is a view similar to FIG. 10 showing a modified form of the invention;

FIG. 12 is a view taken as indicated by line 12—12 on FIG. 11; and

FIG. 13 is an isometric, diagrammatic view of a portion of my construction and including three input shafts.

The structure provided by this invention includes, generally, an elongate, horizontally disposed frame or housing A with front and rear ends, an elongate deflection beam B with front and rear ends arranged within and extending longitudinally of the housing, a primary input shaft P rotatably carried by the housing and secured to the front end of the beam, at right angle thereto, a secondary input shaft S rotatably carried by the frame A on an axis normal to the axis of the beam B and in rearward spaced relationship from the shaft P and spaced vertically from the beam, drive means D between the shaft S and the beam B, support means E between the frame and the rear end of the beam, a dial gauge assembly G between the frame and the beam for measuring deflection of the beam, mounting means F for the gauge and contact means I between the gauge assembly and the beam.

The structure further includes a combination carrying handle and gauge guard H fixed to the frame or housing A and overlying the gauge assembly.

The housing A is preferably a simple, downwardly opening box-like cast alluminum structure with top, side and end walls 10, 11 and 12. In practice, and as shown, the top wall 10 is provided with a cylindral opening 14 to receive the dial gauge mounting means F and is formed to define tray-like receptacles to receive and hold wrench sockets and other small parts that are likely to be used in connection with the tester.

The side walls 11 of the housing are provided with two spaced pairs of axially aligned openings 15 and 16 in the forward portions thereof to accommodate bearings C and C' for the shafts P and S.

The end walls 12 can, as shown, be provided with apertured mounting pads 17 to facilitate permanently mounting the housing to a bench top or the like.

It will be apparent that full, substantially unobstructed access to the interior of the housing A can be had through the open bottom thereof.

While the particular housing A illustrated and described above is preferred, it will be apparent and it is to be understood that an open framework or the like could be used in its stead without adversely affecting or departing from the spirit of the invention.

The deflection beam is a simple, elongate piece of length of bar stock of high quality, heat treated steel and is round in cross-section so as to facilitate easy and accurate machining. The beam is especially proportioned and treated so that the maximum stress that can be applied thereto falls safely within the stress limits and the like of the material from which it is established.

The primary drive shaft P is an elongate cylindrical shaft arranged within the front end portion of the housing to extend transversely thereof and in axial alignment with the openings 15 in the side walls 11. The shaft P has end portions 20 of reduced diameter projecting through the openings 15 and has polygonal tool engaging heads 21 projecting axially outwardly from the portions 20 and which are accessible at the exterior of the housings A, at the opposite sides thereof.

The shaft P is further provided with a transversely extending beam receiving opening 22 intermediate its ends and in or through which the forward end of the beam B is snugly, slidably, or press-fitted. A set screw 23 is preferably engaged through the shaft to engage and securely hold the beam against displacement.

The shaft P is freely rotatably supported in and relative to the housing by the bearings C, which bearings are preferably anti-friction ball bearing assemblies engaged and seated on and about the end portions 20 of the shaft, in the openings 15 in the side walls and are retained in the openings 15 by annular keeper plates 24 engaged about the extensions 20, overlying the openings 15 and releasably screw fastened to the exterior surfaces of the side walls 11 of the housing A, as clearly illustrated in FIG. 1 and FIG. 3 of the drawings.

From the foregoing, it will be apparent that the beam B is effectively pivotally supported at its front end by the shaft P and that vertically directed deflecting forces are applied directly thereto upon the application of torsional forces onto and through the shaft P, as by engaging of the heads 21 of the shaft P with a torque wrench which is to be tested.

The support means E at the rear end of the housing A and beam B is adapted to support and hold the rear end of the beam stationary with respect to vertical movement and displacement and yet allow for limited free axial or longitudinal shifting of the beam. The means E is shown as including an anti-friction roller 30 rotatably carried on a shaft 31 engaged through and extending between a pair of laterally spaced brackets 31' fixed to the top wall 10 of the housing. The roller 30 establishes rolling bearing engagement with the top center line of the beam B at the rear portion thereof. The brackets 31' are provided with longitudinally extending slots 32 at their upper end portions through which retaining or mounting fastener assemblies 33, carried by the top wall 10, are engaged and so that the position of the roller 30 can be adjusted longitudinally of the beam B, as desired and/or as circumstances require. The roller 30 is preferably established by the outer ring of an annular anti-friction ball bearing assembly, the inner ring of which assembly is engaged about the bolt 31 extending through and between brackets 31'.

It will be apparent that by shifting the roller longitudinally of the housing and relative to the beam, the effective length of the beam is varied in such a manner that adjustment and calibration of the construction can be effected. The means E next includes a support means to compensate for the weight of the beam and to normally yieldingly urge the rear end of the beam up and engaged with the roller 30. This means is shown as including a substantially vertical tension spring 35 engaged with and between a screw-like spring mounting post 36 at the rear end of the beam and a spring hook 37 fixed in the rear end of the housing substantially above the post 36.

In addition to the above, the support means E can and is shown as including stop means to engage the bottom side of the beam B at the rear end portion thereof to limit or prevent downward movement of the beam. The stop means is shown as including a bracket 38 fixed to and depending from the top wall 10 of the housing A and extending beneath the beam B, in spaced relationship therewith and a vertically extending stop screw 39 engaged through the bracket 38 to occur below the beam and projecting upwardly into normally stopping contact with or in close proximity to the bottom side of the beam.

The dial gauge assembly G includes a standard long range dial indicator gauge 40 such as is produced by Federal Products Corporation and serves to measure the deflection of the beam at the central portion thereof and by means of a specially calibrated dial face, converts the deflection into torque units of force, such as inch, pounds or foot pounds of force, as desired or as circumstances require.

The gauge 40 is shown as including a cylindrical case 41 with a glass window 42 at its front end and through which a suitably calibrated dial face 43 and pointer 44 can be advantageously viewed and read.

In addition to the above, the gauge 40 is provided with a rearwardly projecting apertured mounting boss 45 on the rear wall of the case 41; an upwardly projecting reset means 46 at the top of the case, an elongate cylindrical neck 47 depending from the case and an operating stem 48 projecting downwardly from within the neck and having a lower end related to the beam.

The assembly G next includes the mounting means F, which means includes a flat support disc or turn-table 50 engaged in the opening 14 in the top 10 of the housing A in concentric rotating relationship therein. The turn table 50 has a retaining flange 51 about its upper portion to engage the top surface of the top wall and to support the table in the opening 14, a central opening 52 slidably receiving the neck 47 of the gauge 40, a vertical, upwardly projecting mounting post 53 radially offset from the opening 52, a vertically extending vertically adjustable stud 54 engaged in and projecting from the top of the post 53 and through the boss 45. Lock nuts 55, 56 and 57 are provided on the stud to engage the post and opposite sides of the boss 45 whereby the vertical positioning of the gauge 40 relative to the table 50 can be effectively adjusted and set.

Finally, the mounting means F of the assembly G includes a plurality (three) of thumb screw-actuated clamps 58, carried by the top wall 10 of the case A in circumferentially spaced relationship about the table 50 and having portions engaging the top of the flange 51 of the table to normally hold the flange clamped tight on said top wall. The clamps 58 are operable to release pressure on the table so that the table can be rotated in the opening 14 and so that the gauge 40 can be turned about its vertical axis to any desired rotative position. With the above capability, it will be apparent that the face of the dial gauge can be disposed at any desired rotative position by the operator of the construction and to that position where viewing the dial face is most convenient.

The contact means I is adapted to establish contact between the beam B and the lower end of the stem 48 of the gauge 40 and is shown as including a block 160 with a central bore in and through which the beam B is slidably engaged and a set screw 161 fixing the block in fixed position longitudinally of the beam. The block 160 has a flat, smooth bearing surface 162 on which the lower terminal end of the stem 48 is normally engaged. The lower end of the stem is rounded, as illustrated, whereby point contact, with minimum frictional drag, is established between the stem and the block.

The construction thus far described is, but for certain special structural details, essentially the same as the basic torque wrench tester structure disclosed and claimed in my earlier issued U.S. Pat. No. 3,364,725.

In addition to the foregoing, the instant invention includes a second input means comprising the aforementioned secondary input shaft S, drive means D between the shaft S and the beam B and other support means and structure related thereto.

The shaft S is spaced rearward of the shaft P to occur between the shaft P and the contact means I and in vertical spaced relationship above the beam B, as clearly illustrated in FIGS. 1, 2 and 4 of the drawings.

The shaft S is an elongate cylindrical part arranged within the middle portion of the housing or frame A to extend transversely thereof and in axial alignment with the openings 16 in the side walls 11. The shaft S has end portions 20' of reduced diameter projecting through the openings 16, and has polygonal tool engaging heads 21' projecting outwardly from the portions 20 and which are accessible at the exterior of the housing at the opposite sides thereof.

The shaft S is freely rotatably supported in and relative to the housing by anti-friction ball bearing assemblies C' engaged and seated on and about the portions 20' and in the openings 16 and which are retained in the openings by annular keeper plates 24' engaged about the extensions 20', overlying the openings 16 and secured to the side walls by screw fasteners, as shown in FIGS. 1 and 4 of the drawings.

The drive means D between the shaft S and the beam B is adapted to transmit or conduct forces applied to and through the shaft S to the beam and is shown as including an elongate tension or tow line L having an upper end portion engaged over and about the shaft S, at the center thereof, anchoring means X securing that end of the line to the shaft and coupler means Y coupling the other, lower end of the line L to the shaft.

In the case illustrated, the line L is a short length of flexible, non-stretchable metal cable with terminals 60 and 61 fixed to its ends and characterized by short, straight, cylindrical sleeve portions engaging the terminal end portions of the line and spherical, finial portions.

The coupler means Y between the lower end of the line L and the shaft B preferably includes a coupling block 62 with a beam receiving opening 63 and a rearwardly and upwardly opening key-hole type recess 64 to slidably receive the sleeve portion and to hold captive the spherical portion of the terminal 61 of the line L, as clearly illustrated in FIG. 9 of the drawings. The block 62 is slidably engaged on the beam B and is releasably secured in fixed position therein by a suitable set screw 65, as clearly illustrated.

It is apparent and it is to be understood that the means Y illustrated is only typical of one preferred form of coupling means that can be advantageously utilized.

In practice, the block 62 of the coupler means Y is positioned on the shaft B so that the line L extends vertically and tangentially from the rear side of the shaft S. It is to be noted that as a result of the foregoing relationship, the radial distance between the axis of the shaft S and the vertical, tangentially related portion of the line L establishes a moment arm and affords a lever action whereby a predetermined mechanical advantage is afforded between the shaft S and the beam B.

By altering or varying the effective diametric extent of the shaft S and thereby altering the mechanical advantage afforded between the shaft S and the beam B, the effective force range of the shaft S, in the normal operation of the tester, can be effectively varied and the construction can be effectively adjusted.

As a result of and in accordance with the above, the structure at and between the central portion of the shaft S and the upper portion of the line L is subject to substantial variation.

In one carrying out of the invention, the diametric extent of the central portion of the shaft S can be varied to provide the desired moment arm or mechanical advantage (see FIG. 2). In another form or carrying out of the invention, the central portion of the shaft S' can be provided with an annular groove 70 to receive the line L, the depth of which is established to provide the necessary or desired moment arm and/or mechanical advantage (see FIG. 10 of the drawings). In yet another form or carrying out of the invention, and as shown in FIGS. 11 and 12 of the drawings, the shaft S'' is provided with and includes a central annular sheave 71 slidably engaged on the central portion of the shaft, secured thereto by means of a set screw 72 and about which the line L is engaged.

It will be apparent that in the last noted alternative form of the invention, a plurality of sheaves 71, of different diametric extent can be provided or made available whereby the tester can be altered to operate in different ranges of force and/or can be effectively adjusted by utilizing different diameter sheaves.

Still further, and as illustrated, the shaft S'' can be provided with a line receiving groove 70' similar to the groove 70 shown in FIG. 10 of the drawings so the input shaft S of the tester can be effectively used with or without the noted sheaves 71, whereby the number of available selective operating force ranges, for shaft S is extended.

The anchoring means X can vary widely in form and construction. In the forms of the invention shown in FIGS. 2 and 10 of the drawings, the means X include simple, elongate retaining bars 80 extending parallel with the shafts S and S', at the lower forward quarters thereof, with formed central portions overlying the sleeve portions of the terminals 60 of the lines L and having their opposite ends secured to the shafts by screw fasteners 81.

In the form of the invention shown in FIGS. 11 and 12 of the drawings, the means X' includes an axially and radially outwardly opening notch 83 in the lower forward quarter of the sheave 71 defining a semi-circular seat 84 to cooperatively engage the spherical finial of the terminal 60 on the line L.

In practice, and as shown in FIG. 11 of the drawing, the shaft S'' can be provided with an anchoring means X'' which is structurally similar and functionally identical to the means X'.

It is to be noted that when the structure is assembled, the block 62 of the coupling means Y is adjusted longitudinally of the beam so that the portion of the line L extending upwardly from the block toward the shaft is substantially vertical. Accordingly, the primary or basic longitudinal positioning of the block is adjusted in light of or with respect to the diametric extent of the shaft S, the groove 70 in the shaft or the diametric extent of the sheave 71 on the shaft, whichever the case might be.

Positioning of the block 62 and establishing of the basic vertical relationship of the line L in the above noted manner is carried out or effected with adjusting and setting the input shaft S for operation within each selected, predetermined, range of force.

Subsequent to establishing the above noted basic setting and to effect fine adjustment of the input shaft S, the block 62 of the means Y can be and frequently must be shifted a short distance, forwardly or rearwardly on the beam B. The extent of such longitudinal shifting of the block 62 is very limited and is such that the portion of the line extending tangentially from the shaft or from a sheave on the shaft is or remains substantially vertical and is not so inclined as to result in angularly resolved forces, with respect to the axis of the beam, as might adversely affect the functioning and accuracy of the construction.

It is to be noted that since the shaft S is rotated less than one quarter of one revolution when the tester is used, the line L need not extend completely about or around the shaft, but need only extend about said shaft a greater extent than the maximum extent to which the shaft is to be rotated. In the instant case, the line is shown extending 180° about the shaft (or the sheave 70).

The dial face 43 of the gauge 40 is provided with two sets of calibrations 43' and 43$^2$, one set being provided for the primary input shaft and the other being provided for the secondary input shaft S. It is to be noted that the mechanical advantage afforded by and/or through the shaft S, as noted in the preceding, is such that the force applied to the shaft S is increased through or by the noted movement arm. As a result of the above, less force need be applied to the shaft S than need be applied to the shaft P to effect the same amount of deflection of the beam. Accordingly, the shaft S is suitable for and is used to indicate the lower of two different ranges of forces.

It will be apparent that the dial gauge assembly is such that it is only effective to measure upward vertical deflection of the central portion of the beam B and that the roller 30 of the support means only engages the top of the beam and is effective to adjust the effective longitudinal extent of the beam with respect to upward vertical deflection of the central portion thereof. Further, it will be apparent that the drive means D between the shaft S and beam B is only effective to deflect the central portion of the beam upwardly. Accordingly, referring to FIG. 2 of the drawings, the shafts P and S are operational when turned in a counter clockwise direction. While the above is true, the tester is effective to test torque wrenches in both clockwise and counter-clockwise directions by virtue of the fact that each shaft has an accessible tool or wrench engaging head at its opposite ends and is such that clockwise rotation of a wrench engaged with one end of each shaft and counter-clockwise rotation of the same or another wrench at the other end of each shaft results in operational upward deflection of the central portion of the beam.

With the structure illustrated and described, it will be apparent that by the addition of the secondary input shaft S with its related drive means D and the provision of a second set of calibrations on the dial face of the gauge 40, the usefullness of the remainder of the structure is doubled, that is, the beam B and its related support structure and means, rather than being effective to test wrenches within one range of forces is effective to test wrenches within two different ranges of forces. With the structure here provided, one tester at little additional cost, with little additional weight and with no additional size or space requirements serves the function and/or takes the place of two torque wrench testers as provided by the prior art, or takes the place of the more costly form of compound tester, provided by the prior art wherein an enlarged case or housing is provided to carry and house a plurality of separate torque transmitting and transcribing mechanisms.

It is to be noted that the primary or basic torque transmitting means or structure here provided and including, broadly, the input shaft P, beam B, support means E and dial gauge assembly G, functions differently than the secondary torque transmitting means which includes, broadly, the shaft S, beam B, support means E and dial gauge assembly G. In the primary torque transmitting means torque applied to the shaft P at the forward end of the beam tends to turn or rotate the rear end of the beam B upwardly against the roller 30 of the support means. Since the support means prevents or stops such rotation of movement of the beam, the beam flexes and yields to the applied force, which flexure results in upward deflection of the central portion of the beam. The extent of such deflection of the beam is directly related to the magnitude of the torsional force applied to the shaft P and is measured by the dial gauge 40 (the related set of calibrations on the face of which transcribes the extent of deflection into desired force units). In the secondary torque transmitting means the torsional forces applied to the shaft S, through the drive means D are applied to the central portion of the beam, to pull and deflect central portions thereof upwardly. In this case, the beam is bearing supported at its opposite ends by the shaft P and support means E, independent of the applied force, and the applied force, at the central portion thereof, tends to draw and bow the beam into the deflected condition.

The extent of deflection of the beam caused by the secondary torque transmitting means is measured and transcribed by the dial gauge 40 in the same manner as in the primary torque transmitting means. The primary torque transmitting means utilizing the input shaft P for the application of force is stronger or stiffer than the secondary means and is utilized to test the higher ranges of forces to be encountered. Accordingly, the secondary means, utilizing the secondary shaft S for the application of forces is used to test the lower ranges of forces to be encountered.

In practice, and as diagrammatically illustrated in FIG. 13 of the drawings, a plurality (two or more) secondary input shafts $S^2$, with related drive means $D^2$ can be provided. In such a case, a single unit, having a single housing, deflection beam, support means and dial assembly can be provided for testing torque wrenches in as many separate torque ranges as there are input shafts. While there are practical limits to the number of secondary input shafts that can be provided, the provision of two and possibly three such shafts would clearly be practical.

At present, the structure herein provided is regularly produced by applicants' assignee, Consolidated Devices, Inc. of California. One model being produced is effective to test applied torsional forces from 0 to 100 inch-ounces in increments of 0.1 inch-ounces and from 0 to 500 inch-ounces in increments of 0.5 inch-ounces, while another, for example, is effective to test applied torsional forces from 0 to 2.50 inch-pounds in increments of 0.25 inch-pounds and from 0 to 2000 inch-pounds in increments of 2 inch-pounds. These testers are accurate to +— 1% or within one graduation on the dial face, whichever is greater.

Having described only a typical preferred form and application of our invention, we do not wish to be limited to the specific details herein set forth, but wish to reserve to ourselves any modifications and/or variations which may appear to those skilled in the art and which fall within the scope of the following claims;

Having described our invention, we claim:

1. A torque wrench tester of the character referred to comprising an elongate support structure having front and rear ends, an elongate primary input shaft with tool-engaging heads at its ends extending transverse of and rotatably carried by the front end portion of the support structure, an elongate deflection beam arranged within and extending longitudinally of the support structure and having a front end secured with the primary shaft, selectively longitudinally shiftable support means carried by the rear portion of the support structure above and in stopped engagement with the rear end of the beam, a dial indicator carried by the support structure above the central portion of the beam and having a vertically shiftable operating stem depending into engagement with the top of the beam to measure upward deflection of the beam upon the application of torsional forces on and through the primary shaft, an elongate secondary input shaft with tool-engaging heads at its ends extending transverse of and rotatably carried by the support structure and spaced above the beam and rearward of the primary shaft and drive means comprising a cable, anchoring means securing one end of the cable to the secondary shaft and coupling means securing the other end of the cable to the portion of the beam nearest thereto, said drive means operable to transmit torsional forces applied onto and through the secondary beam into upwardly directed lineal forces on said nearest portion of the beam, said coupling means being shiftable longitudinally of the shaft and including means to secure it in fixed position on said shaft.

2. A torque wrench tester as set forth in claim 1 wherein the anchoring means includes an annular groove of predetermined inner radial extent in the secondary shaft and cooperatively receiving an upper portion of the cable, whereby the cable extends tangentially from said shaft on an axis substantially normal to the axis of the beam.

3. A torque wrench tester as set forth in claim 2 wherein the coupling means comprises a part engaged with and between the cable and the beam and shiftable longitudinally of the beam and including means to releasably secure said part in fixed position longitudinally of the beam.

4. A torque wrench tester as set forth in claim 3 wherein said shafts are rotatably supported by anti-friction bearing assemblies carried by said support structure and wherein said engaging heads on the shafts occur laterally outwardly of and are accessible at the exterior of said bearing means and support structure.

5. A torque wrench tester as set forth in claim 1 wherein, said anchoring means includes a sheave of predetermined diametric extent secured on and projecting radially from the secondary shaft on a common plane with the central, longitudinal vertical plane of the shaft, a finial seat in the sheave and a finial on the cable and engaged in said seat, said cable extending about a portion of the sheave and thence tangentially therefrom on an axis substantially normal to the axis of the shaft.

6. A torque wrench tester as set forth in claim 5 wherein the coupling means comprises a part engaged with and between the cable and the beam and shiftable longitudinally of the beam and including means to releasably secure said part in fixed position longitudinally of the beam.

7. A torque wrench tester as set forth in claim 6 wherein said shafts are rotatably supported by anti-friction bearing assemblies carried by said support structure and wherein said engaging heads on the shafts occur laterally outwardly of and are accessible at the exterior of said bearing means and support structure.

* * * * *